UNITED STATES PATENT OFFICE.

KARL HEINRICH DANGLER, OF STEUBENVILLE, OHIO.

COMPOSITION FOR GLASS.

SPECIFICATION forming part of Letters Patent No. 572,968, dated December 15, 1896.

Application filed February 10, 1896. Serial No. 578,785. (No specimens.)

*To all whom it may concern:*

Be it known that I, KARL HEINRICH DANGLER, a citizen of the United States of America, residing at Steubenville, in the county of Jefferson and State of Ohio, have invented certain new and useful Improvements in Composition for Glass-Pots and the Like, of which the following is a specification.

This invention relates to certain new and useful improvements in a composition for glass-pots and the like, and has for its object the construction of a glass-pot that can be used any number of times and that will not crack as in the ordinary construction; furthermore, that will stand a greater degree of heat and will not be affected by the changes in temperature.

My composition consists of the following ingredients combined in the proportions stated, viz: three hundred and eighty-two parts clay, two hundred and sixty parts kaolin. These two ingredients are mixed together and serve as a base for the composition, and after being mixed the following ingredients are added: two hundred and eighty-five parts quartz, forty parts ground white sandstone. When these parts have been added, it will serve to render the substance able to withstand a great degree of heat, thereby preventing the pot from cracking and settling, and also serve to solidify the composition. After the mixing of these ingredients the following are added thereto, which will complete the one thousand parts: twenty-two parts calcite, six parts flint, five parts common salt. These latter ingredients serve to close the pores that are caused by the heat, and makes the entire composition a solid mass. The various ingredients are provided with water to reduce them to a pliable mass, in which state they can be worked and applied.

By the use of this composition of the parts, mixed in the proportions as above stated, it will be found that a considerable saving will be obtained in the cost of the glass-pots, as the same can be made much cheaper than at the present time, and will also be much more durable, not being affected by a high degree of heat or sudden change in temperature, as heretofore stated.

In the mixing of the composition slight changes may be made from the exact proportions of the different ingredients without departing from the general spirit of my invention.

Having fully described my invention, what I claim, and desire to secure by Letters Patent, is—

A composition for glass-pots and the like, consisting of three hundred and eighty-two parts clay, two hundred and sixty parts kaolin, two hundred and eighty-five parts quartz, forty parts ground white sandstone, twenty-two parts calcite, six parts flint, and five parts common salt, as specified.

In testimony whereof I affix my signature in presence of two witnesses.

KARL HEINRICH DANGLER.

Witnesses:
J. L. BRAUN,
F. ANTON WEISKE.